(12) United States Patent
Takahara (10) Patent No.: US 6,656,597 B2
(45) Date of Patent: Dec. 2, 2003

(54) LAMINATED GLASS AND GLASS PLATE USED FOR PRODUCING LAMINATED GLASS

(75) Inventor: Masayuki Takahara, Aiko-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 37 days.

(21) Appl. No.: 10/001,808

(22) Filed: Dec. 5, 2001

(65) Prior Publication Data

US 2002/0106519 A1 Aug. 8, 2002

(30) Foreign Application Priority Data

Dec. 6, 2000 (JP) .......................... 2000-371742

(51) Int. Cl.$^7$ .......................... B32B 17/00; B32B 23/02; B32B 7/02; B60J 1/00; C03B 27/00
(52) U.S. Cl. .................. 428/432; 428/192; 428/210; 428/213; 428/218; 296/146.1; 65/114; 65/115
(58) Field of Search ............................. 428/192, 210, 428/212, 213, 220, 204, 209, 426; 296/146.1, 84.1, 85, 200; 65/114, 115

(56) References Cited

U.S. PATENT DOCUMENTS

| | | | |
|---|---|---|---|
| 2,897,632 A | * | 8/1959 | Fowler et al. ................ 65/103 |
| 5,198,304 A | | 3/1993 | Kraemling et al. |
| 5,380,575 A | | 1/1995 | Kuster et al. |
| 5,397,647 A | | 3/1995 | Krameling et al. |
| 5,938,810 A | * | 8/1999 | De Vries, Jr. et al. ........ 65/268 |
| 6,370,917 B1 | * | 4/2002 | Kato et al. ..................... 65/114 |

FOREIGN PATENT DOCUMENTS

| | | |
|---|---|---|
| JP | 4-231361 | 8/1992 |
| JP | 5-170468 | 7/1993 |
| JP | 6-87328 | 3/1994 |
| JP | 6-503063 | 4/1994 |

* cited by examiner

*Primary Examiner*—Deborah Jones
*Assistant Examiner*—G. A. Blackwell-Rudasill
(74) *Attorney, Agent, or Firm*—Oblon, Spivak, McClelland, Maier & Neustadt, P.C.

(57) ABSTRACT

A glass plate has a thickness of from 1.5 to 3 mm, and it has a peripheral region having a predetermined width along the edge line of the plate and having its principal stress difference of compressive properties, an intermediate region having a predetermined width adjacent to an inner periphery of the peripheral region and having its principal stress difference of tensile properties and a central region occupying an inner peripheral side of the intermediate region wherein the central region has an averaged surface compression stress of from 15 to 35 MPa, and the peripheral region has a width of from 5 to 20 mm; the maximum value of the principal stress difference averaged in a thickness direction of the plate along its center line is from 20 to 40 MPa, and the minimum value of the principal stress difference averaged in a thickness direction along the center line is from 8 to 25 MPa.

15 Claims, 6 Drawing Sheets

LAMINATED GLASS AND GLASS PLATE USED FOR PRODUCING LAMINATED GLASS

CROSS-REFERENCE TO RELATED APPLICATIONS

This application is related to and claims priority, under 35 U.S.C. §119, from Japanese Patent Application No. 2000-371742, filed on Dec. 6, 2000, in the Japanese Patent Office, the entire contents of which Japanese Patent Application, including specification, claims, drawings and summary, is incorporated herein by reference in its entirety.

DISCUSSION OF BACKGROUND

The present invention relates to a laminated glass and a glass plate used for producing the laminated glass.

Heretofore, tempered glass has mainly been used, in a form of single plate, for a shielding window of automobiles. In recent years, however, laminated glass has been used because of its having good security performance and sound insulating properties. The laminated glass is prepared by interposing an interlayer made of polyvinylbutyral or the like between two glass plates and bonding them. Accordingly, even if crushing to the laminated glass is attempted by knocking it with a blunt instrument, the laminated glass can not easily be penetrated because the interlayer has stretching properties. A criminal actor or actors of car such as robbery or burglar often break a window glass, unlock the door and invade into the cabin. If the invasion is not successful in a short time, he or they may give up the criminal act. Accordingly, it will be effective to use the laminated glass, which is difficult to break, as a window glass from the viewpoint of security for automobile.

There are the following publications in which a laminated glass is used for a window glass.

(1) JP-A-4-231361 (hereinafter "JP '361 publication")

The JP '361 publication discloses a glass plate in which the residual stress in a peripheral region (region $A_1$) of the glass plate and the residual stress in a central region (region $C_1$) of the glass plate are described.

(2) JP-A-6-503063 (hereinafter "JP '063 publication")

The JP '063 publication discloses a glass plate in which the residual stress in a peripheral region (region $A_2$), the residual stress in a central region (region $C_2$) and an intermediate region (region $B_2$) between the region $A_2$ and the region $C_2$ are described.

(3) JP-A-6-87328 (hereinafter "JP '338 publication")

The JP '328 publication discloses a glass plate in which the residual stress in an edge region (region $B_3$) adjacent to a peripheral region (region $A_3$) and the residual stress in a central region (region $C_3$) are described.

In each of the publications, the distribution of stress values of a glass plate is described specifically using concrete numerical values which are shown in Tables 1 to 3. In the tables, each tensile stress in a core portion (or an inner portion) indicates the principal stress difference at an intermediate point in a thickness direction of the glass plate, which is known in principle ½ of the compression stress in the surface portion. Accordingly, in Tables 1 and 2 described below, the compression stress in the surface portion which can be estimated from the tensile stress in the core portion is also described. Further, the stress in the edge portion is the principal stress difference in a peripheral portion of the glass plate. In this case, a positive value indicates a compression stress and a negative value indicates a tensile stress.

For example, when two principal stresses perpendicularly crossing to each other are both compression stresses, the principal stress difference has compressive properties, and when two principal stresses perpendicularly crossing to each other are both tensile stresses, the principal stress difference has tensile properties. When either of two principal stresses is a compression stress and the other is a tensile stress, the principal stress difference has compressive properties when the principal stress of compression is stronger, and has tensile properties when the principal stress of tensile is stronger.

TABLE 1

| | | Region $C_1$ | |
|---|---|---|---|
| Thickness of plate (mm) | Tensile stress of core portion of region $A_1$ | Tensile stress of core portion (MPa) | Compression stress of surface (MPa) |
| 2.0 | 54–64 | 38–60 | 76–120 |
| 3.0 | 46.7–55 | 33–55 | 66–110 |

TABLE 2

| Thickness of plate (mm) | Stress of edge portion of region $A_2$ (MPa) | Tensile stress of core portion of region $B_2$ (MPa) | Compression stress of surface of region $C_2$ (MPa) |
|---|---|---|---|
| 1.5–4 | 50–100 | 10 or less | 40–100 |

TABLE 3

| | | Region $C_3$ | |
|---|---|---|---|
| Thickness of plate (mm) | Tensile stress of core portion of region $B_3$ | Tensile stress of core portion (MPa) | Compression stress of surface (MPa) |
| 1.5 | 27–57 | 25–42 | 50–84 |
| 3.0 | 20–47 | 17.5–33 | 35–66 |

Here, the generally used method for producing tempered glass and the mechanism of generating the residual stress will be described. The tempered glass is produced by forming a residual compression stress layer in the surface of a glass plate and at the same time, forming a residual tensile stress layer in the core portion. Specifically, the residual stress layers are formed by causing a temperature difference between the surface and the core portion of the glass plate by blowing cooling air to the surface of the glass plate heated to nearly the softening point. If the glass plate has a certain thickness and infinite surface dimensions and if both surfaces are cooled uniformly, the distribution of the stress along its thickness direction exhibits a distribution of substantially parabolic shape. Further, the compression stress in the surface becomes twice as large as the tensile stress in the center in a thickness direction of the glass plate, and the integrated value of stress along the thickness direction becomes "0".

However, glass plates have actually finite dimensions, and end surfaces exist in the peripheral portion. Accordingly, the glass plate is cooled from not only the surface but also the end surfaces, whereby a region (peripheral region) having a width two or three times as much as the thickness of the glass plate in the peripheral portion in which the principal stress difference averaged in the thickness direction has compressive properties, is produced. Further, at an inner peripheral side of the peripheral region, there is formed a region (intermediate region) in which the principal stress difference averaged in the thickness direction has tensile properties, so as to balance with the compression stress in the peripheral region.

Next, description will be made as to the principal stress difference. When a plane perpendicular to a main surface of the glass plate (a plane cross-sectioned perpendicularly to a main surface of the glass plate) is selected, such plane can take any angle with respect to a linear line extending parallel to the main surface of the glass plate. When a single point is selected in such plane, the stress value acting on this point and having a direction perpendicular to the selected plane can take different values depending on an angle of the selected plane. In various angles, there are an angle at which the stress value is maximal and an angle at which the stress value is minimal. The principal stress direction includes a direction of stress indicating the maximum value and a direction of stress indicating the minimum value, which is perpendicular to the direction indicating the maximum value. In this specification, the direction of stress indicating the maximum value is called as the principal stress direction.

However, the principal stress itself can not directly be measured. Therefore, the principal stress is evaluated indirectly by using the principal stress difference obtained by a photoelasticity method. The principal stress difference obtained by the photoelasticity method corresponds to a value obtained by dividing the sum of the values which are obtained by subtracting the minimum value of stress from the maximum value of stress at each point in all points arranged in a thickness direction of the plate, by the thickness of the plate. Namely, the principal stress difference corresponds to an averaged value obtained by dividing an integrated value of the maximum value of stress minus the minimum value of stress by the thickness of the plate at each point. Accordingly, when a certain point on a main surface of the glass plate is chosen, an average of the integrated value obtained by subtracting the minimum value of stress from the maximum value of stress at each point in the thickness direction of the plate from the selected point is the principal stress difference at the selected point. Further, the principal stress direction in this case is the principal stress direction at the selected point. Further, principal stress direction in this specification is a direction parallel to the main surface of the glass plate.

As is clear from the numerical values described in the last right column in Tables 1 to 3, any averaged compression stress of the surface (hereinbelow, referred to as the averaged surface compression stress) in the central region is 35 MPa or more which is sufficient in strength against an impact force. However, the glass plate having a strength of 35 MPa or more is hardly broken when a human body hits the glass plate in car crushing or the like, and the glass plate may not absorb sufficiently the impact force whereby the human body may be damaged. Accordingly, it is necessary to reduce the averaged surface compression stress in the central region so that the glass plate can be broken.

On the other hand, a door glass of an automobile can be slided vertically so as to open and close the window, and an upper side portion of the glass plate is exposed in an open state of window. Since the exposed upper side portion is apt to receive an impact due to the contact of a passenger or an impact at the time of opening or closing the glass plate, it should have a strength sufficient to withstand such external force. Further, a side edge portion of the sliding window is fixed to the window sash, and a lower edge portion thereof is a portion used for attaching the regulator as a power source for sliding the glass plate. Accordingly, these portions are apt to receive a mechanical external force. Thus, since various external forces are applied to the peripheral portion of the sliding window, the peripheral portion of the sliding window should have a large strength in comparison with the central region.

As understood from the above-mentioned, in the laminated glass used for a sliding window for an automobile, the peripheral portion of it should have a sufficient strength durable to various external forces and the central region having a strength of such extent that when an excessive impact due to the contact of a human body will applied, it can be broken. In the above-mentioned publications, however, there is no disclosure of a glass plate and a laminated glass satisfying these conditions.

SUMMARY OF THE INVENTION

It is an object of the present invention to eliminate the above-mentioned problems in the conventional techniques and to provide a laminated glass suitable for a sliding window of an automobile or the like and a glass plate used for producing the laminated glass.

In accordance with the present invention, there is provided a glass plate characterized in that the thickness of the plate is from 1.5 to 3 mm, and it has a peripheral region having a predetermined width along the edge line of the plate and having its principal stress difference of compressive properties, an intermediate region having a predetermined width adjacent to an inner periphery of the peripheral region and having its principal stress difference of tensile properties and a central region occupying an inner peripheral side of the intermediate region wherein the central region has an averaged surface compression stress of from 15 to 35 MPa, and the peripheral region has a width of from 5 to 20 mm; the maximum value of the principal stress difference averaged in a thickness direction of the plate along its center line is from 20 to 40 MPa, and the minimum value of the principal stress difference averaged in a thickness direction along the center line is from 8 to 25 MPa.

Further, in accordance with the present invention, there is provided a laminated glass comprising two or more glass plates and an interlayer bonded between adjacent glass plates wherein at least one of the glass plates is such one as above-mentioned.

DETAILED DESCRIPTION OF THE PREFERRED EMBODIMENTS

Preferred embodiments of the present invention will be described with reference to the drawings.

Figure 1:
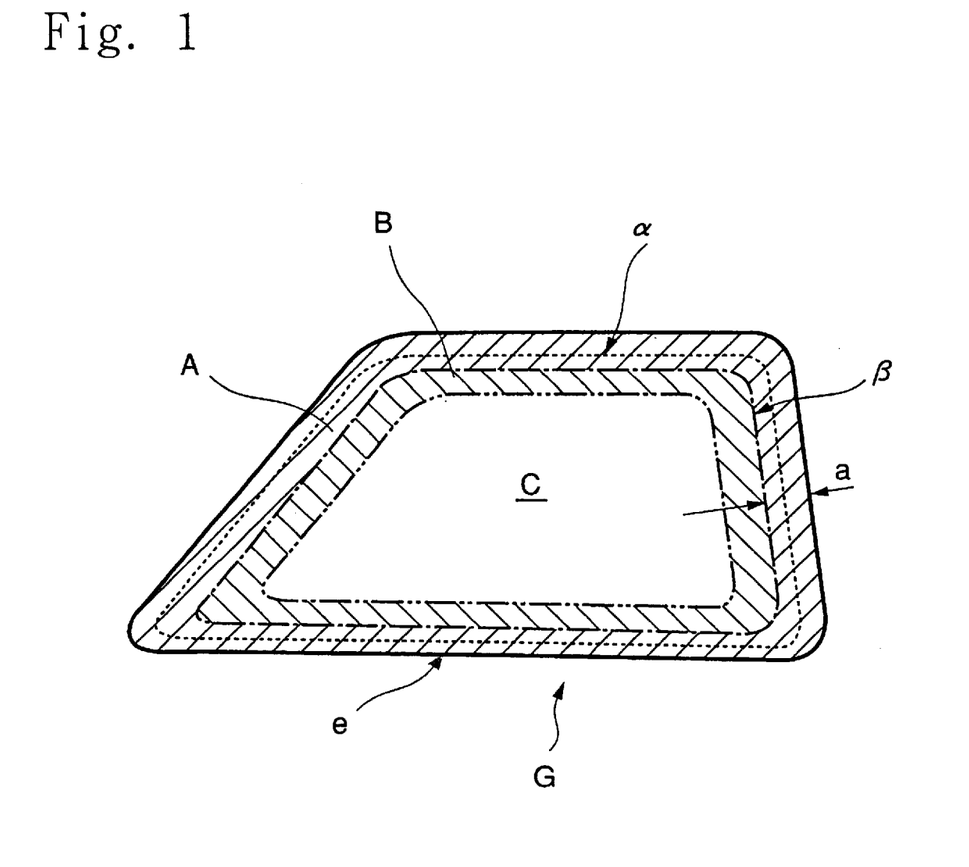
FIG. 1 is a front view showing diagrammatically an embodiment of the glass plate according to the present invention.

In FIG. 1, a glass plate G has a thickness of from 1.5 to 3 mm, and has three regions in front view. Namely, there are a peripheral region A having a predetermined width along an edge portion e (an outermost region of the glass plate G), an intermediate region B having a predetermined width which is adjacent to the peripheral region A and a central region C which occupies an inner peripheral side of the intermediate region B. The principal stress difference in the peripheral region A has compressive properties and the principal stress difference in the intermediate region B has tensile properties. The averaged surface compression stress $\sigma_c$ in the central region c is from 15 to 35 MPa.

A broken line drawn in the peripheral region A indicates a center line α located at an intermediate position between the border line β between the peripheral region A and the intermediate region B and the edge portion e of the glass plate G. The border line β is located a distance "a" of approximately 5–20 mm apart from the edge portion e of the glass plate G, and corresponds to a line formed by connecting each point that the principal stress difference of the glass plate G becomes "0". The maximum value $\sigma_{a1}$ of the principal stress difference (compression value) on the center line α is from 20 to 40 MPa, and the minimum value $\sigma_{a2}$ is from 8 to 25 MPa, preferably, from 10 to 25 MPa wherein the relation of $\sigma_{a1} > \sigma_{a2}$ is always established. The principal stress difference includes a value having compressive properties and a value having tensile properties. In this specification, a positive sign indicates the principal stress difference having compressive properties and a negative sign indicates the principal stress difference having tensile properties.

Here, the fact that the strength of the peripheral region is sufficient can be explained as follows. Since the principal stress difference of the peripheral region of a glass plate has generally a value of compressive properties, the peripheral portion of the glass plate has a fairly large strength because of its having such compressive properties. Since the peripheral region A of the glass plate G according to this embodiment has a width of 5–20 mm, it can be said that the peripheral region has a sufficient strength durable to an external force.

The determination of the maximum value $\sigma_{a1}$ and the minimum values $\sigma_{a2}$ of the principal stress difference on the center line α to be respectively from 20 to 40 MPa and from 10 to 25 MPa is derived from the following. In cooling the glass plate, it is cooled from the main surfaces and at the same time, from end surface portions. Namely, the value of the principal stress difference in an edge portion of the glass plate is larger than the value of the principal stress difference of a portion on the center line α. Further, since the maximum value $\sigma_{a1}$ and the minimum value $\sigma_{a2}$ of the principal stress difference on the center line α are respectively from 20 to 40 MPa and from 8 to 25 MPa, the peripheral portion of the glass plate of this embodiment has a sufficient strength.

By rendering the averaged surface compression stress $\sigma_c$ in the central region C to be from 15 to 35 MPa, the glass plate G becomes such one capable of absorbing an excessively strong impact. On the other hand, when the averaged surface compression stress value of the central region C is merely decreased in order to absorb sufficiently an impact, the strength of the peripheral portion of the glass plate used for a sliding window may not be sufficient. In consideration of the above, it is preferable that the maximum value $\sigma_{a1}$ and the minimum value $\sigma_{a2}$ of the principal stress difference on the border line α are from 20 to 40 MPa and from 8 to 25 MPa respectively.

Further, in the glass plate G of this embodiment, it is preferable that the maximum value $\sigma_{e1}$ and the minimum value $\sigma_{e2}$ of the principal stress difference in the edge portion e are from 60 to 100 MPa and from 40 to 70 MPa respectively wherein the relation of $\sigma_{e1} > \sigma_{e2}$ is always established. Further, it is preferable that the portion having the maximum value of the principal stress difference in the edge portion e or on the center line α of the glass plate G is at an upper side of the glass plate in a state of being assembled in an automobile and the portion having the minimum value of the principal stress difference in the edge portion e or on the center line α is at a lower side in a state of being assembled in an automobile. Since the sliding window is frequently subjected to opening and closing operations, the upper side of the glass plate is often exposed outside whereby various external forces by, for example, the contact of the passenger may be applied. Accordingly, by making the principal stress difference of the upper side portion, which is often exposed outside, higher than that of the lower side portion, the breakage of the glass plate can be prevented even when an unexpected external force is applied at the time of opening and closing the window.

(Method for Producing the Glass Plate)

In the following, explanation will be made as to the method for producing the glass plate satisfying the above-mentioned conditions. The glass plate satisfying the above-mentioned conditions can be produced by utilizing the method disclosed in, for example, JP-A-5-170468 (hereinbelow referred to as the JP '468 publication). This publication discloses such technique that a glass plate is transferred into a heating furnace; the glass plate is heated to a predetermined temperature; the glass plate which has been transferred outside the heating furnace is supported by a ring, and the glass plate supported by the ring is pressed to a lower surface of a shaping mold to bend-shape the glass plate. The glass plate after being bend-shaped is cooled by blowing air in a state that it is supported by the ring.

When the glass plate according to this embodiment is produced, however, it is necessary to make the cooling rate lower than that disclosed in the JP '468 publication. Namely, the pressure of cooling air to be blown should be smaller than that of the JP '468 publication. When the heated glass plate is supported by the ring, the temperature of the peripheral portion in contact with the ring rapidly decreases in comparison with the central region which is not supported by the ring. As a result, the peripheral region A whose principal stress difference has compressive properties is formed in a peripheral portion of the glass plate G, and at the same time, the intermediate region B whose principal stress difference has tensile properties is formed at an inner peripheral side of the peripheral region A so that the tensile stress is balanced with the compressive stress in the peripheral region A. The border line β between the peripheral region A and the intermediate region B exists 5–20 mm apart from the edge portion e, and has a principal stress difference of "0". Further, the maximum value $\sigma_{a1}$ and the minimum value $\sigma_{a2}$ of the principal stress difference on the center line a are from 20 to 40 MPa and from 8 to 25 MPa respectively.

On the other hand, in order that the portion having the maximum value of the principal stress difference is at an upper side in a state of being assembled in an automobile and the portion having the minimum value of the principal stress difference is at a lower side in a state of being assembled in an automobile, it is preferable to transfer the glass plate as follows in the method for producing the glass plate described above. Namely, when the glass plate G is transferred from the heating furnace to the outside, the glass plate G is transferred in a state that an upper side of the glass plate is directed to a traveling direction. As a result, the upper side is out sooner than the lower side from the heating furnace so that the upper side is cooled prior to the lower side. Thus, the upper side can be cooled so that the temperature of the upper side is lower than the temperature of the lower side.

Further, in order that the averaged surface compression stress in the central region C and the maximum value and the minimum value of the principal stress difference on the center line α are controlled with high accuracy, the following method should be employed. Namely, the glass plate G is supported by the ring when the glass plate is cooled, and the rate of cooling to the peripheral region A at the time of cooling is made larger than the rate of cooling to the central region C. Specifically, just before the heated glass plate G is supported by the ring, the central region C of the glass plate G is brought to contact with a cooling plate having a shape corresponding to the surface of the glass plate G. In this case, it is preferable that a material having a large thermal capacity is used for the cooling plate, and when the glass plate is supported by the ring, the temperature of the central region C of the glass plate G is decreased at a lower rate than the rate for decreasing the temperature of the peripheral region A of the glass plate G.

FIGS. 2A to 2G are cross-sectional views showing an example of the method for producing the glass plate. The steps shown in these Figures are the same as those described in the JP '468 publication except that a cooling plate 22 is used. With reference to these Figures, steps of producing the glass plate shown in FIG. 1 will be described.

Figure 2A:
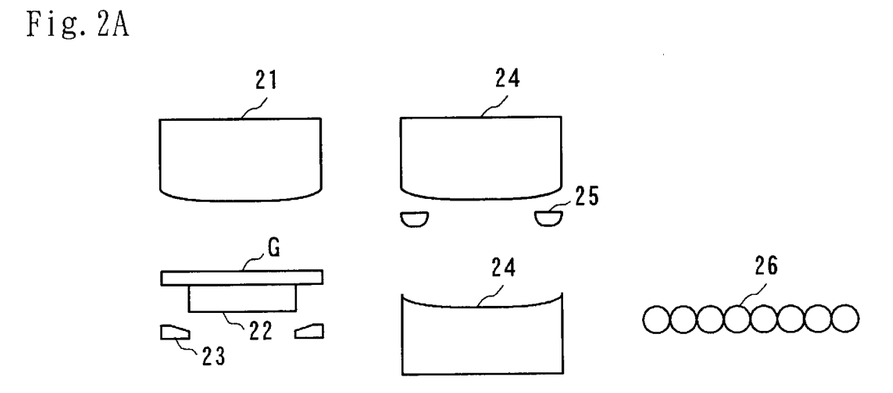
FIG. 2A is a cross-sectional view showing diagrammatically a step of producing the glass plate.

First, the cooling plate 22 is disposed just below a mold 21, and the glass plate which has just been transferred from the heating furnace (not shown) is placed on the cooling plate 22.

The cooling plate 22 is a jig made of metal whose upper face has the same shape as the central region C of the glass plate G, and the upper face of the cooling plate 22 having a large thermal capacity is covered with a material such as alamide fibers or the like. Further, a positioner (not shown) is positioned in the vicinity of the cooling plate 22 so that the position of the glass plate G placed on the cooling plate 22 is determined by the positioner. As a result, only the central region C of the glass plate G is brought into contact with the cooling plate 22, and only the central region C is cooled by the cooling plate 22 whereby the temperature of the central region C is decreased sooner that the peripheral region A. As a result, when an air-quenching treatment, which is described later, is carried out, the strength of the central region C is weaker than the peripheral region A (FIG. 2A).

A press quenching ring 23 which is a frame member made of metal and has a larger inner diameter than the cooling plate 22, is disposed normally at a position lower than the upper face of the cooling plate 22. At a downstream side of the mold 21, vertically opposing blowing ports are arranged so that the both surfaces of the glass plate G can be cooled. A frame-like transferring ring 25 is disposed below an upper blowing port 24. At the downstream side of the opposing blowing ports 24, a plurality of rollers 26 each covered with a rubber member are disposed.

Figure 2B:
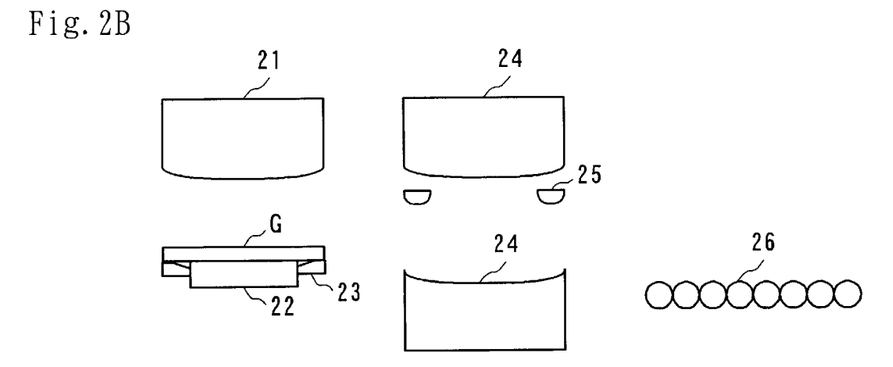
FIG. 2B is a cross-sectional view showing diagrammatically a step of producing the glass plate.
Figure 2C:
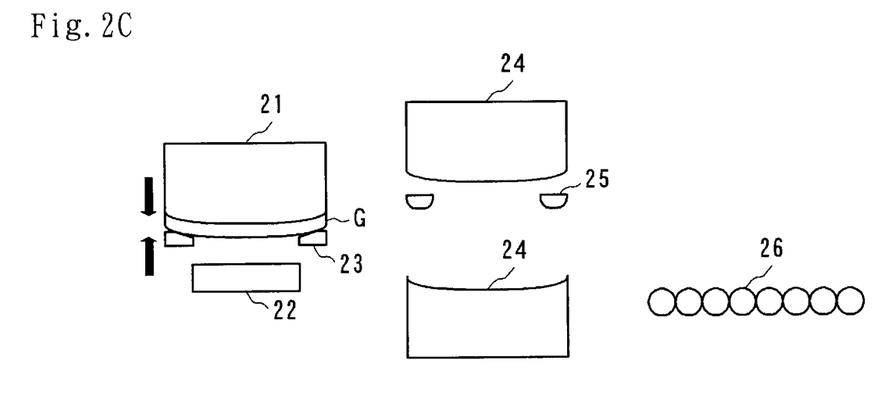
FIG. 2C is a cross-sectional view showing diagrammatically a step of producing the glass plate.

The glass plate G placed on the cooling plate 22 is transferred onto the press quenching ring 23 by which the glass plate is moved upward. While the press quenching ring 23 holding the glass plate G is moved upward, the mold 21 is moved downward whereby the glass plate G is pressed to a curved lower surface of the mold 21. As a result, the glass plate G is bend-shaped into a shape corresponding to the lower surface of the mold 21 (FIGS. 2B and 2C).

Figure 2D:
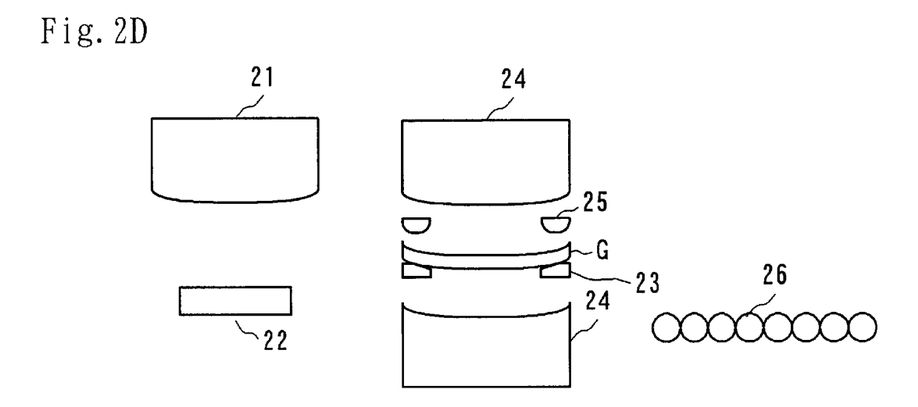
FIG. 2D is a cross-sectional view showing diagrammatically a step of producing the glass plate.
Figure 2E:
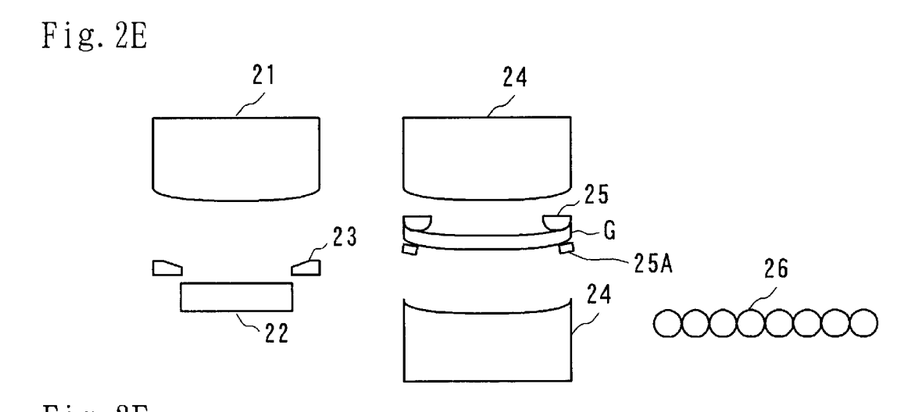
FIG. 2E is a cross-sectional view showing diagrammatically a step of producing the glass plate.

Then, the mold 21 is moved upward whereby the glass plate G is separated from the mold 21, and the press quenching ring 23 is moved horizontally to a space between the vertically opposing blowing ports 24 (FIG. 2D). As soon as the press quenching ring 23 reaches the space, cooling air is blown from the vertically opposing blowing ports 24 so that both main surfaces of the glass plate G are cooled. The pressure of air blown from a lower blowing port 24 is adjusted to be stronger than the pressure of air blown from the upper blowing port 24. Accordingly, the glass plate G is lifted up from the press quenching ring 23 due to the difference of air pressure, whereby the glass plate is brought to contact with the transferring ring 25. The glass plate G in contact with the transferring ring 25 is fixed by pawls 25A so as not to drop. During the above-mentioned operations, the press quenching ring 23 is moved horizontally onto the cooling plate 23 (FIG. 2E).

Figure 2F:
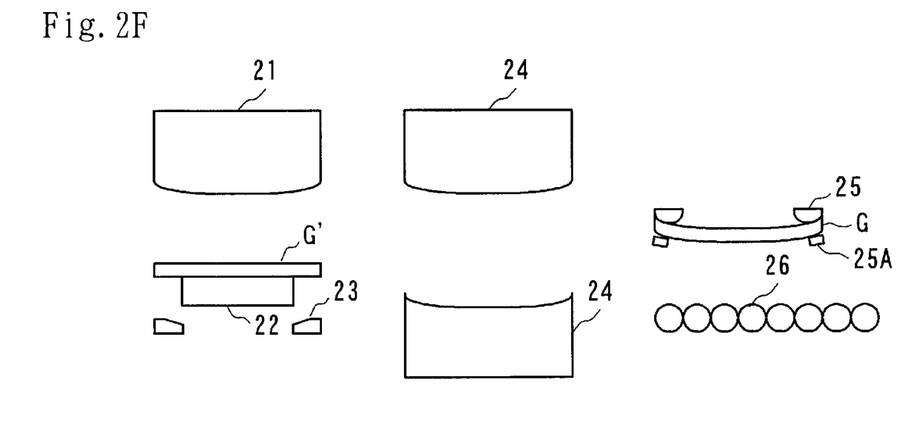
FIG. 2F is a cross-sectional view showing diagrammatically a step of producing the glass plate.
Figure 2G:
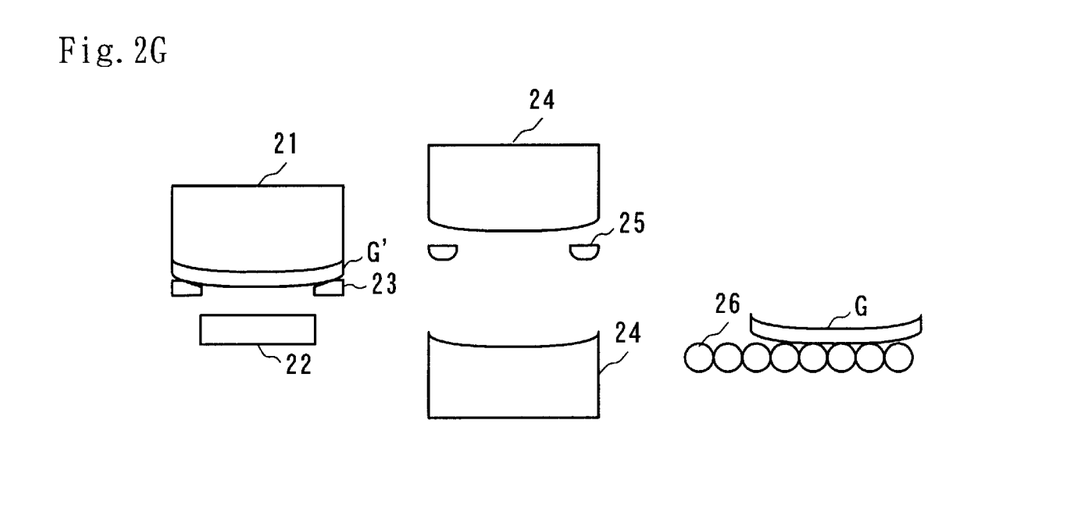
FIG. 2G is a cross-sectional view showing diagrammatically a step of producing the glass plate.

Then, the glass plate G fixed on the transferring ring 25 by means of the pawls 25A is moved horizontally onto rollers 26, and the glass plate falls onto the rollers 26 by disengaging the pawls 25A. Then, the glass plate G is transferred on a right side in the Figure by means of the rollers 26. On the other hand, the press quenching ring 23 is moved below the cooling plate 22. Thus, the press quenching ring 23 is ready to bend-shape a new glass plate G' placed on the cooling plate 22 by pressing it to the mold 21 (FIGS. 2F and 2G). By repeating the above-mentioned steps, the bend-shaping and the quenching treatment to a plurality of glass plates can be carried out continuously.

Two or more glass plates produced according to the steps as described above and an interlayer made of polyvinylbutyral or the like are laminated alternately, and the laminated product is pressed in an autoclave, whereby a laminated glass having an integrated structure of the glass plates and the interlayer is produced. In the production of such laminated glass, the glass plate shown in FIG. 1 may be used for all or a part of the laminated glass.

The present invention is not limited to using the steps shown in FIGS. 2A to 2G, but may be such that for example, the glass plate after it has been bend-shaped by a press ring, is transferred to the quenching ring and the glass plate is moved by the quenching ring to a space between the blowing ports 24 where the cooling is conducted.

Figure 3:
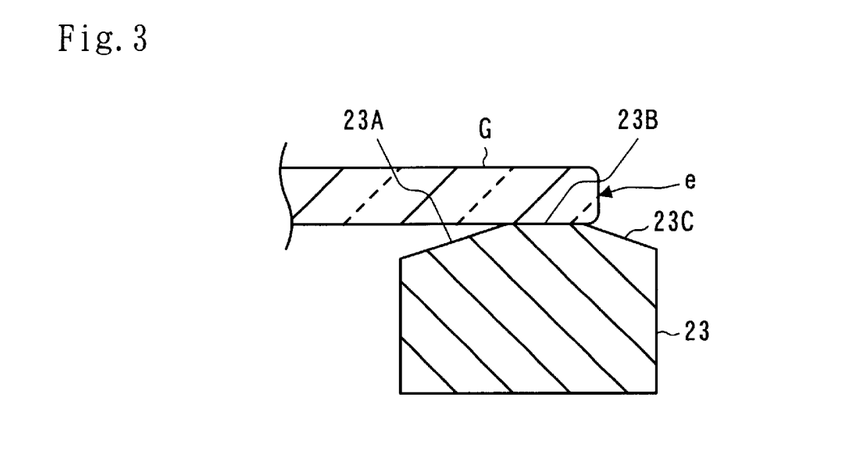
FIG. 3 is a cross-sectional view showing diagrammatically an embodiment of a press quenching ring.

FIG. 3 is a cross-sectional view partly omitted showing the detail of the press quenching ring 23. The press quenching ring 23 is featurized by having a hexagonal shape in cross section and having a horizontal plane 23B to which the glass plate G contacts before bend-shaping, a first slant plane 23A to which the glass plate G contacts after the bend-shaping and a second slant plane 23C which does not contact the glass plate G. Before the bend-shaping, the glass plate G contacts the horizontal plane 23B because its having a flat plate shape, and then, the bend-shaped glass plate G contacts the first slant plane 23A. Thus, the peripheral region A of the glass plate G always contacts the press quenching ring 23 in a predetermined area irrespective of before and after the bend-shaping. Accordingly, the peripheral region A can effectively be cooled, and therefore, it is preferable in producing the glass plate of this embodiment. Further, a metallic mesh may be attached to an inner peripheral side of the press quenching ring 23 so as to prevent the central region C from suffering air-quenching.

(Method for Measuring the Stress Value)

Next, explanation will be made as to the method for measuring the stress.

(A) Measurement of the surface compression stress

The measurement of the surface compression stress is conducted based on Japanese Industrial Standard (JIS) R3222. JIS R3222 rules measurement points. In the measurement of the surface compression stress of the glass plate of the present invention, however, it is unnecessary to use the ruled method but measurement is conducted by using a plurality of suitably selected points to obtain an averaged value on measured values.

It is preferable to select the same plural numbers of measurement points: each point at which the surface compression stress value is expected to be close to the maximum value and each point at which the surface compression stress value is expected to be close to the minimum value. It is appropriate to consider that the surface compression stress value becomes maximal at the crossing point of the surface of the glass plate and a line of blowing direction of the cooling air to cool the glass plate, and it is appropriate to consider that the surface compression stress value becomes minimal at an intermediate point between two points adjacent to each other with respect to the crossing point. In the example described hereinafter, the measurement is conducted by using 8 points: 4 points just below the nozzles and 4 points in the vicinity of these points.

Figure 4:
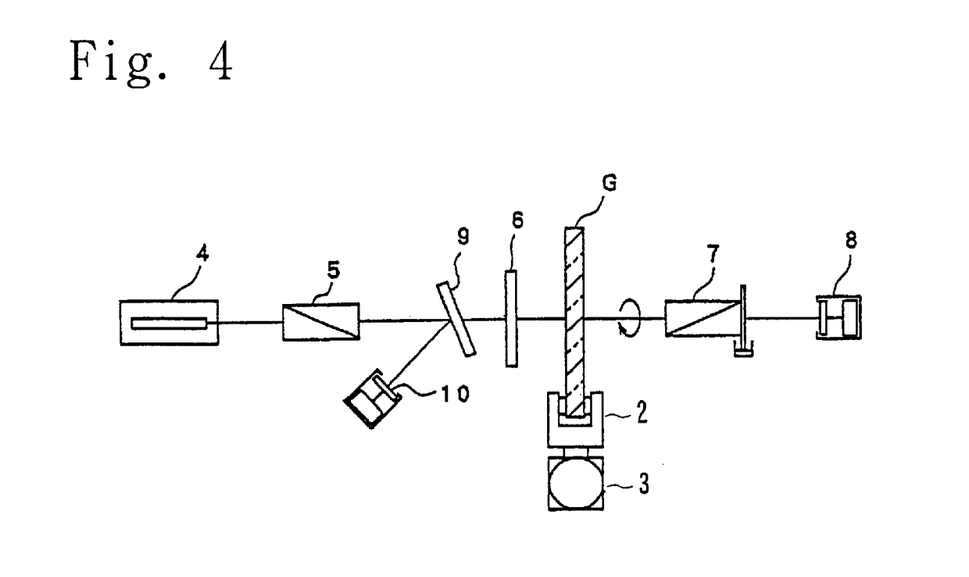
FIG. 4 is a diagram showing a measuring device for measuring the principal stress direction and the principal stress difference.

(B) Measurement of the principal stress direction and the principal stress difference FIG. 4 shows a device for measuring principal stress directions and the principal stress difference. The glass plate G is fixed to a holder 2 which is attached to a movable portion of an XY stage 3 so that the position of the glass plate G can be changed in vertical and lateral directions by the XY stage 3.

First, a circularly polarized light is introduced into the glass plate G. The introduced light becomes an elliptically polarized light by the influence of a strain in the glass plate G and the elliptically polarized light transmits through the glass plate. The state of polarization of the transmitting light is measured. Then, the principal stress directions and the principal stress difference are calculated by using a result of measurement. Light beams irradiated from a light source 4 are passed through a polarizer 5 in which the light beams become a linearly polarized light. The linearly polarized light is passed through a ¼ wave shifting plate 6 whereby the linearly polarized light becomes the circularly polarized light. A rotating analyzer 7 is disposed in rear of the glass plate G which is arranged perpendicular to the incident light beams. The circularly polarized light incident into the glass plate G passes through the glass plate G during which the circularly polarized light becomes the elliptically polarized light according to a strain in the glass plate G. Thus obtained elliptically polarized light is passed through the rotating analyzer 7 to reach a photodetector 8. By measuring an output of the photodetector 8, the state of the elliptically polarized light can be detected. The analyzer 7 is rotated 1° for each measurement point of the glass plate G, and the measurement of 180° in total is conducted.

The principal stress directions and the principal stress difference can be obtained as follows from the state of the thus obtained elliptically polarized light. The principal stress directions are represented by $\theta_1$ and $\theta_2$, and the phase difference corresponding to the principal stress difference is represented by $\delta$. The output $I(\phi)$ of the photodetector is given by formula (1) where k is the proportionality factor and $\phi$ is the rotation angle of the analyzer.

The ratio of the minimum value $I_{min}$ to the maximum value $I_{max}$ of the output of the photodetector is represented by ellipticity R. R and $\delta$ satisfy the relation of formula (2) where $\delta > 0$. Accordingly, the phase difference $\delta$ and the principal stress directions $\theta_1$ and $\theta_2$ are expressed by formulas (3) to (5). Namely, by obtaining the ellipticity R of the elliptically polarized light and the rotation angle $\phi$ of the analyzer (the angle of the long axis of an ellipse when the maximum and minimum output values can be obtained), the principal stress directions and the principal stress difference can be obtained.

The relation between the principal stress difference $\Delta\sigma$ and $\delta$ corresponding to it can be expressed by the following formula (6) where C is the photoelastic constant (=2.63 nm/cm/kg/cm$^2$), t is the thickness of the glass plate at a portion to be measured, and $\lambda$ is the wavelength of light radiated from the light source 4. In the measurement of the stress in Example described later, a light source of $\lambda$=623.8 nm was used. The unit of angle is radian and $\pi$ is the circular constant.

$$I(\phi)=k\{1-\sin\delta\cdot\sin 2(\theta-\phi)\} \quad \text{Formula (1)}$$

$$R=I_{min}/I_{max}=(1-\sin\delta)/(1+\sin\delta) \quad \text{Formula (2)}$$

$$\delta=\sin^{-1}\{(1-R)/(1+R)\} \quad \text{Formula (3)}$$

$$\theta_1=(\phi+\pi/4)\pm n\pi \quad \text{Formula (4)}$$

$$\theta_2=(\phi-\pi/4)\pm n\pi \quad \text{Formula (5)}$$

$$\Delta\sigma=\{\lambda/(c\cdot t)\}\cdot(\delta/2\pi) \quad \text{Formula (6)}$$

A He—Ne laser was used as the light source 4. The used laser can collect the light beams to a minute point and can detect a minute change of stress in the glass plate due to unevenness of tempering and so on. Further, Gram-Tompson prism having good polarization properties was used as the polarizer 5. A half mirror 9 is disposed between the polarizer 5 and the ¼ wave shifting plate 6 to take reference light. A polished crystal plate is used for the ¼ wave shifting plate 6 so that a phase difference of $\pi/2$ is produced with respect to a wavelength of 632.8 nm. The same element as the polarizer 5 was used for the analyzer 7. The photodetector 8 and a reference light detector 10 are constituted by a solar cell provided with an interference filter on its light receiving surface. The interference filter is to transmit selectively light beams of a specified wavelength radiated from the light source 4 and to reduce the interference of light, to the photodetector, incident from an external portion.

As described above, the border line $\beta$ at which the principal stress difference becomes "0" can be determined by measuring the principal stress difference and the principal stress directions by using a large number of measurement points. Further, it is possible to find the maximum value and minimum value of the principal stress difference on the center line $\alpha$. In the device shown in FIG. 4, it may be difficult to measure the principal stress difference in the edge portion of the glass plate depending on the arrangement of an optical element of a measuring system. Accordingly, it is preferable to measure the principal stress difference of a portion in the vicinity of the edge portion with the device shown in FIG. 4 so that the principal stress difference of the edge portion is estimated based on a result of the measurement. Further, the principal stress difference of the edge portion of the glass plate can be measured with Babinet' compensator which is known as a stress measuring device for a glass plate.

EXAMPLE

Now, the present invention will be described in further detail with reference to Examples. However, it should be understood that the present invention is by no means restricted to such specific Examples.

Figure 5:
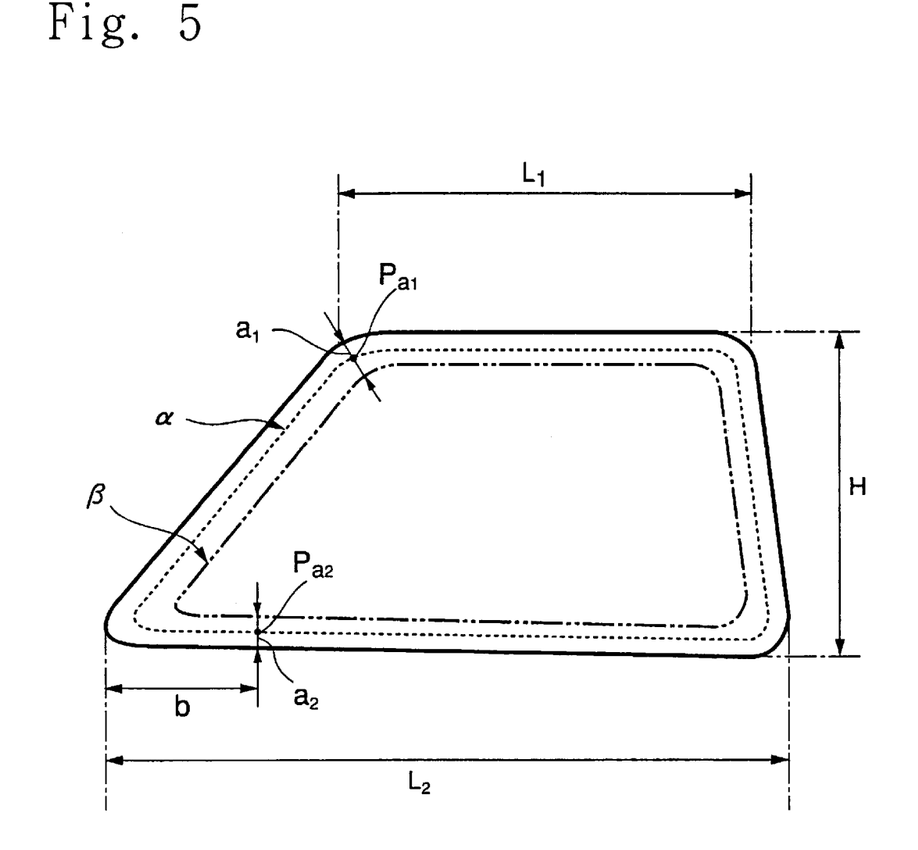
FIG. 5 is a front view showing diagrammatically the size of the glass plate and portions to which the measurement of stress is conducted.

FIG. 5 is a front view showing diagrammatically the glass plate of the present invention wherein a left side in the paper surface of the figure corresponds to a front side of the glass plate in a state of being assembled in an automobile. The dimensions of the glass plate were determined so that the length of an upper side $L_1$=600 mm, the length of a lower side $L_2$=800 mm, the height H=550 mm and the thickness= 2.2 mm. A point indicated by $P_{a1}$ is a point on the center line α, which is the middle point between a front side corner portion of the upper side of the glass plate G and a front side corner portion of the upper side of the border line β. A line through point $P_{a1}$ which is perpendicular to a line tangent to the edge portion e, a line tangent to the centerline α, and a line tangent to the borderline β spans a distance of $a_1$. A point indicated by $P_{a2}$ is a crossing point of the center line α and a line extended perpendicularly to a lower side (on the paper surface) at a point apart from a front corner portion of the lower side of the glass plate by a distance b=65 mm in the rear direction along the lower side. A line through point $P_{a2}$ which is perpendicular to the edge portion e, the centerline α, and the borderline β spans a distance of $a_2$.

A glass plate was produced by the same method as disclosed in the JP '468 publication. The temperature of the glass plate just after it has been drawn from the heating furnace was 660° C. and the air pressure of cooling air blown to the glass plate was 5 kPa. The principal stress difference and so on of the glass plate produced are shown in Table 4. The principal stress difference of the edge portion e was measured with the Babinet' compensator.

The value $\sigma_c$ stated in Table 4 represents the averaged surface compression stress of 8 points, as representative points, in the central region C. The values $\Delta\sigma_{a1}$ and $\Delta\sigma_{a2}$ represent the principal stress difference at the point $P_{a1}$ and $P_{a2}$ respectively. The value $a_1$ or $a_2$ is twice as much as the distance from the point $P_{a1}$ or $P_{a2}$ to the edge line of the glass plate, and indicates the width of the peripheral region A at each point $P_{a1}$ or $P_{a2}$. The value $\Delta\sigma_{b1}$ or $\Delta\sigma_{b2}$ is the minimum value of the principal stress difference in the intermediate region B which exists on a perpendicular line, passing through the point $P_{a1}$ or $P_{a2}$, extended from a side of the glass plate, i.e., the maximum value of the principal stress difference having tensile properties. Each of the values has a negative sign because it has tensile properties. The maximum value $\Delta\sigma_{e1}$ of the principal stress difference in the edge portion exists at an upper side of the laminated glass in a state of being assembled in an automobile, and $\Delta\sigma_{e2}$ exists at a lower side of the laminated glass in a state of being assembled in an automobile.

TABLE 4

| $\sigma_c$ [MPa] | $\Delta\sigma_{a1}$ [MPa] | $\Delta\sigma_{a2}$ [MPa] | $\Delta\sigma_{e1}$ [MPa] | $\Delta\sigma_{e2}$ [MPa] | $\Delta\sigma_{b1}$ [MPa] | $\Delta\sigma_{b2}$ [MPa] | $a_1$ [mm] | $A_2$ [mm] |
|---|---|---|---|---|---|---|---|---|
| 25 | 22 | 8 | 66 | 45 | −10 | −6 | 17 | 13 |

Another glass plate was prepared by the same procedure as for the above-mentioned glass plate. Then, two glass plates were bonded by interposing a polyvinylbutyral interlayer having a thickness of 0.76 mm to produce a laminated glass. In evaluating the impact absorption rate on the thus obtained laminated glass, tests were conducted based on "Headform impact resistance tests" ruled in ECE R43 and JIS R3212 to find that the laminated glass satisfied the both standards. Further, this laminated glass was set, as a sliding window, to an automobile. It was confirmed that it has a sufficient strength in the peripheral portion in an actual state of use.

As described above, the glass plate of the present invention is provided with the central region having a sufficient strength to absorb an impact, and the peripheral region and the intermediate region each having a strength higher than the central region. Accordingly, such glass and the laminated glass using the glass plates can preferably be used as a sliding window for an automobile because the sliding window can not easily be broken even when an external force is applied to its peripheral portion which is often exposed by opening operations of the sliding window.

Further, the laminated glass for a sliding window which can be safe against an impact as described above and which has an infrared cutting function can be provided by using an interlayer in which infrared-shielding fine particles having a particle size of 0.2 μm or less are dispersed. As the material for the infrared-shielding fine particles, the infrared-shielding fine particles made of a metal selected from the group consisting of Sn, Ti, Si, Zn, Zr, Fe, Al, Cr, Co, Ce, In, Ni, Ag, Cu, Pt, Mn, Ta, W, V and Mo, an oxide, nitride or sulfide of such a metal, or a Sb- or F-doped compound thereof may be mentioned. These fine particles can be used as a single type or mixed type of particles. Further, a mixture obtained by mixing a single type or mixed type of the particles with a resin, or a coated product obtained by coating a single type or mixed type of the particles of the resin may be used.

Further, as the infrared-shielding fine particles, it is preferable to use antimony-doped tin oxide (ATO) fine particles or tin-doped indium oxide (ITO) fine particles. The ATO fine particles and the ITO fine particles are both excellent in infrared-shielding properties, and can reduce the amount to be incorporated to the interlayer. In comparison of the ATO fine particles with the ITO fine particles, it is in particular preferable to use the ITO fine particles as the infrared-shielding fine particles because the ITO fine particles are excellent in infrared-shielding properties. Further, when the proportion of the amount of the infrared-shielding fine particles dispersed into the interlayer is determined to be 0.1–0.5 mass part with respect to 100 mass part as the entire mass of the interlayer, infrared communication of car interior-exterior can be realized and temperature rise in the cabin due to the transmission of infrared rays can be prevented.

The entire disclosure of Japanese Patent Application No. 2000-371742 filed on Dec. 6, 2000 including specification, claims, drawings and summary are incorporated herein by reference in its entirety.

What is claimed is:

1. A glass plate comprising:
    a thickness of the glass plate is from 1.5 to 3 mm;
    a peripheral region having a predetermined width along an edge line of the glass plate, having a principal stress difference of compressive properties, and having a width of from 5 to 20 mm;
    an intermediate region having a predetermined width adjacent to an inner periphery of the peripheral region and having a principal stress difference of tensile properties;
    a central region occupying an inner peripheral side of the intermediate region, wherein the central region has an averaged surface compression stress of from 15 to 35 MPa;
    a maximum value of the principal stress difference averaged in a thickness direction of the glass plate along a center line of the peripheral region is from 20 to 40 MPa; and
    a minimum value of the principal stress difference averaged in the thickness direction of the glass plate along the center line of the peripheral region is from 8 to 25 MPa.

2. The glass plate according to claim 1, wherein the maximum value of the principal stress difference averaged in a thickness direction of an edge portion of the glass plate is from 60 to 100 MPa, and the minimum value of the principal stress difference averaged in a thickness direction of the edge portion of the glass plate is from 40 to 70 MPa.

3. The glass plate according to claim 1, wherein the minimum value of the principal stress difference averaged in the thickness direction along the center line of the peripheral region is from 10 to 25 Mpa.

4. The glass plate according to claim 1, wherein the principal stress difference of an upper side portion in a state of being assembled in an automobile is larger than the principal stress difference of a lower side portion in that state.

5. A laminated glass which comprises two or more glass plates and an interlayer bonded between adjacent glass plates wherein at least one of the glass plates is such one as defined in claim 1.

6. The laminated glass according to claim 5, wherein infrared-shielding fine particles having a particle size of 0.2 $\mu$m or less are dispersed in the interlayer.

7. The laminated glass according to claim 6, wherein the infrared-shielding fine particles are made of a tin-doped indium oxide or an antimony-doped tin oxide.

8. The laminated glass according to claim 6, wherein the infrared-shielding fine particles are fine particles made of a metal selected from the group consisting of Sn, Ti, Si, Zn, Zr, Fe, Al, Cr, Co, Ce, In, Ni, Ag, Cu, Pt, Mn, Ta, W, V and Mo, an oxide, nitride or sulfide of such a metal, or a Sb- or F-doped compound thereof.

9. The laminated glass according to claim 8, wherein the infrared-shielding fine particles are made of a mixture obtained by mixing a single type or mixed type of the particles with a resin, or a coated product obtained by coating a single type or mixed type of the particles with a resin.

10. The glass plate according to claim 2, wherein the principal stress difference of an upper side portion in a state of being assembled in an automobile is larger than the principal stress difference of a lower side portion in that state.

11. A laminated glass which comprises two or more glass plates and an interlayer bonded between adjacent glass plates wherein at least one of the glass plates is such one as defined in claim 2.

12. A laminated glass which comprises two or more glass plates and an interlayer bonded between adjacent glass plates wherein at least one of the glass plates is such one as defined in claim 4.

13. A laminated glass which comprises two or more glass plates and an interlayer bonded between adjacent glass plates wherein all of the two or more glass plates are such ones as defined in claim 1.

14. A laminated glass which comprises two or more glass plates and an interlayer bonded between adjacent glass plates wherein all of the two or more glass plates are such ones as defined in claim 2.

15. A laminated glass which comprises two or more glass plates and an interlayer bonded between adjacent glass plates wherein all of the two or more glass plates are such ones as defined in claim 4.

* * * * *